United States Patent [19]

Dunsworth et al.

[11] 3,890,613
[45] June 17, 1975

[54] TECHNIQUE FOR MINIMIZING LOSS OF SENSITIVITY OF BURIED PRESSURE RESPONSIVE DEVICES

[75] Inventors: William K. Dunsworth, Export; Fred G. Geil, Pittsburgh, both of Pa.

[73] Assignee: Westinghouse Electric Corporation, Pittsburgh, Pa.

[22] Filed: Sept. 18, 1973

[21] Appl. No.: 398,350

[52] U.S. Cl. .......... 340/407; 61/36 A; 61/72.1; 138/105; 404/75; 340/236; 340/261
[51] Int. Cl. .......... F16l 1/00; E02d 3/14
[58] Field of Search .......... 340/236, 261, 242, 407; 47/2, 19; 61/36 R, 36 A, 72.1; 71/79, 120; 73/201, 277; 106/13; 138/32, 34, 105; 404/27, 28, 31, 75, 76; 174/37; 252/70; 137/301, 375

[56] References Cited
UNITED STATES PATENTS

| | | | |
|---|---|---|---|
| 950,270 | 2/1910 | Andrews | 73/201 X |
| 2,007,969 | 7/1935 | Grodsky | 138/105 UX |
| 2,162,185 | 6/1939 | Sourwine | 61/36 R X |
| 3,438,021 | 4/1969 | Nelkin et al. | 340/261 |
| 3,648,520 | 3/1972 | Price | 73/277 |
| 3,675,432 | 7/1972 | Keene | 138/105 X |

*Primary Examiner*—John W. Caldwell
*Assistant Examiner*—Daniel Myer
*Attorney, Agent, or Firm*—M. P. Lynch

[57] ABSTRACT

A controlled application of an anti-freeze ingredient to soil covering a buried pressure responsive device such as an intrusion detector, eliminates reduction in sensitivity of the device due to frozen soil conditions. An alternate technique for avoiding frozen soil conditions consists of providing a thermal insulating enclosure for the soil between the ground surface and the pressure responsive device.

1 Claim, 2 Drawing Figures

TECHNIQUE FOR MINIMIZING LOSS OF SENSITIVITY OF BURIED PRESSURE RESPONSIVE DEVICES

BACKGROUND OF THE INVENTION

Practical utilization of buried intrusion detection systems such as that described in U.S. Pat. No. 3,438,021 issued Apr. 8, 1969, entitled "Perimeter Intrusion Alarm," and assigned to the assignee of the present invention, has been limited due to the reduced sensitivity occurring when the soil between the surface of the ground and the pressure responsive intrusion device freezes.

It has been determined through practical use of the system described in the above U.S. Patent that the system operates efficiently in temperature climates where the soil does not freeze to significant depths. In colder climates, where the frost line reaches a depth of more than several inches, severe attenuation of intrusion signals is experienced. This results in undependable operation, or in severe cases, total failure of the system. Conventional methods of thawing the soil result in physical surface changes which reveals the protected area to a potential intruder.

SUMMARY OF THE INVENTION

There are disclosed herein several variations of a technique for preventing the soil between the buried intrusion detection device and the surface of the ground from freezing thus assuring reliable operation of the pressure response of intrusion detection systems in cold climates. This desired result can be achieved through the addition of an anti-freeze agent to the soil which is required to transmit the pressure disturbance on the surface of the ground to the buried intrusion detection device. It can also be accomplished by enclosing the soil within an insulator thus preventing the penetration of the frost line to a level which would adversely affect the sensitivity of the pressure responsive intrusion detection device.

DESCRIPTION OF THE DRAWING

The invention will become more readily apparent from the following exemplary description in connection with the accompanying drawings.

DESCRIPTION OF THE PREFERRED EMBODIMENT

Figure 1:
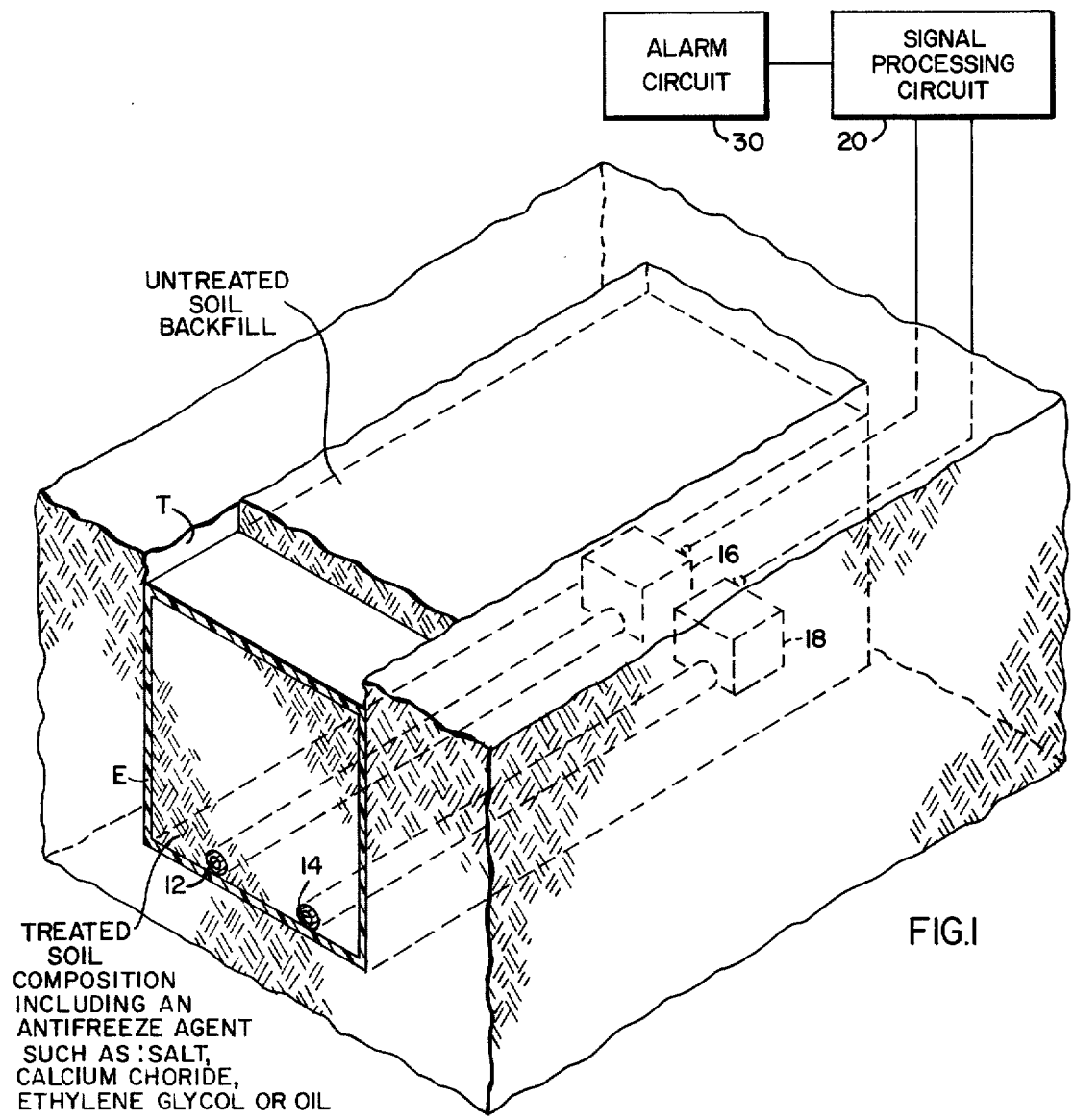
FIG. 1 is a schematic illustration of a buried pressure responsive intrusion detection system incorporating the invention.

The installation of buried perimeter intrusion detection systems of the type illustrated schematically in FIG. 1 generally requires the excavation of a trench several feet deep and several feet wide to permit the positioning of the pressure responsive device in the base of the trench and allow back filling and compaction of the soil to provide intimate contact of the soil between the ground surface G and the pressure responsive device. The compaction is important in order to assure positive transmission of surface disturbances to the intrusion detection device.

The system illustrated in FIG. 1, which corresponds to the typical system described in the above identified U.S. Patent, consists of two buried pressure responsive fluid filled compliant tubes 12 and 14 buried approximately 18 inches beneath the surface of the ground. The pressure transducers 16 and 18 affixed to the ends of the fluid filled tubes transmit electrical signals proportional to pressure changes in the fluid caused by a surface disturbance to a signal processing circuit 20. If the signals from the respective transducers are equal, indicating a surface disturbance corresponding to a remote condition, such as thunder, then no alarm signal is transmitted to the alarm circuit 30. If however a differential exists between the signals developed by the respective transducers indicating a local disturbance of the surface above one of the two fluid filled tubes a signal is transmitted to actuate the alarm circuit 30. A more detailed illustration and description of the system is provided in the above identified U.S. Patent.

As noted above the pressure transmitting capability of the soil is significantly reduced when the soil freezes thus rendering the intrusion detection system inoperative under frozen ground conditions.

It has been determined experimentally that through the addition of anti-freeze agents to the soil between the ground surface and the pressure responsive device that the attenuation of the sensitivity of the system can be significantly reduced. The improved operating conditions under cold climate testing have been achieved through the addition of anti-freeze agents, including salt, calcium chloride, ethylene, glycol and oil, to the soil which is back filled over the buried pressure responsive device.

There is illustrated specifically in FIG. 1 an embodiment wherein the fluid filled tubes 12 and 14 and the back filled soil treated with the anti-freeze agent are packaged in an enclosure E comprised of a thin sheet of nonporous material such as plastic. The enclosure E is positioned within the trench T. The non-porous material is extended to completely enclose the treated back filled soil and fluid filled tubes. The enclosure E is positioned at a depth so as to permit back filling of several inches of untreated soil on top of the plastic material to permit seeding of the soil at the surface to support vegetation. The enclosure of the treated soil and fluid filled tubes within the plastic material prevents contamination of adjacent untreated soil and as well as loss of the anti-freeze agent the seeding of the soil at the surface conceals the installation of the pressure responsive device.

Figure 2:
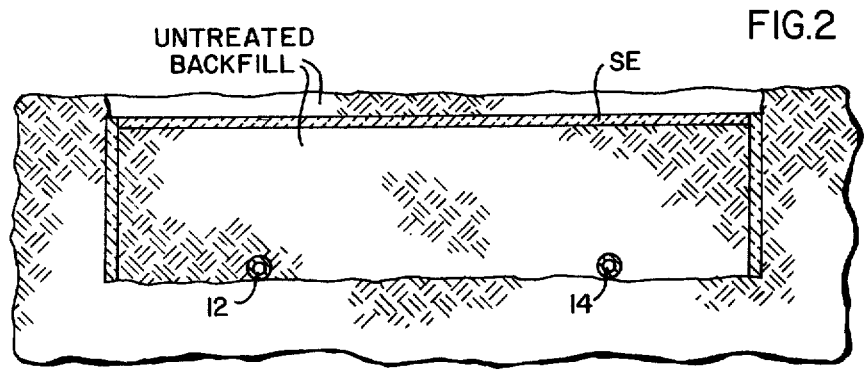
FIG. 2 is an alternate embodiment of the basic invention disclosed in FIG. 1.

The desired result of preventing freezing of the back filled soil can be accomplished in an alternate manner as illustrated in FIG. 2. In place of treating the soil with an anti-freeze agent, sheets of a thermo-insulating material are used to form a soil enclosure SE. Sheets of the thermo-insulating material are positioned on either side of the trench for laterally enclosing the back filled soil and across the top of the trench several inches beneath the ground surface. This technique provides a thermal shield configuration suitable for preventing penetration of the frost line at a level sufficient to significantly attenuate the operation of the pressure responsive device. Once again several inches of soil are positioned on top of the horizontal insulating member to support surface vegetation. Suitable insulating material for use in the embodiment of FIG. 2 includes polystyrene and Dorvon, a product of Dow Co.

The improvement of sensitivity of pressure sensitive devices resulting from experimental evaluation of the above techniques are apparent from the following tabulation:

| Treatment of Soil | Frost Line Depth (inches) | Signal Attenuation Relative to Unfrozen Ground (dB) |
|---|---|---|
| Untreated | 19 | 43.8 |
| Oil 1.2 qt/ft$^3$) | 20 | 34.9 |
| Salt (2.5 lb/ft$^3$) | 21 | 15.2 |
| Thermal Shield (2" thick) | 6 ½ | 18.5 |

We claim:

1. A method for minimizing loss of sensitivity of pressure responsive devices buried beneath the surface of the ground due to frozen soil conditions, comprising the steps of, adding an anti-freeze agent to a predetermined volume of previously untreated natural soil between a buried pressure responsive device and the surface of the ground, limiting the soil contacted by said anti-freeze agent to the soil defined within said predetermined volume, enclosing said pressure responsive device and said predetermined volume of soil within a non-porous enclosure, and covering said enclosure with untreated soil.

* * * * *